United States Patent [19]

Sturgeon

[11] 3,922,973
[45] Dec. 2, 1975

[54] AUTO DESK

[75] Inventor: Hulan D. Sturgeon, Indianapolis, Ind.

[73] Assignee: Lawrence Peska Associates, Inc., New York, N.Y. ; a part interest

[22] Filed: Mar. 11, 1974

[21] Appl. No.: 450,099

[52] U.S. Cl. .............. 108/26; 312/235 A; 297/414; 108/44
[51] Int. Cl.² .................. A47B 23/00; A47B 85/00
[58] Field of Search ............... 108/44, 143, 140, 26; 312/235; 297/252, 253, 414

[56] References Cited
UNITED STATES PATENTS

| 1,782,270 | 11/1930 | Mendenhall | 108/140 |
|---|---|---|---|
| 2,773,705 | 12/1956 | Hirak | 108/44 X |
| 2,862,328 | 12/1958 | Wadsworth | 108/44 |
| 2,934,391 | 4/1960 | Bohnett | 312/235 A |
| 3,061,394 | 10/1962 | Whetstone | 312/235 X |
| 3,104,131 | 9/1963 | Krone | 297/414 |
| 3,140,895 | 7/1964 | Straumann | 312/235 A |
| 3,224,391 | 12/1965 | Cooper | 108/140 |
| R24,805 | 3/1960 | Morrill, Jr. | 297/253 |

Primary Examiner—Roy D. Frazier
Assistant Examiner—Peter A. Aschenbrenner
Attorney, Agent, or Firm—Richard E. Nanfeldt

[57] ABSTRACT

A portable automobile desk for use in vehicles for making reports, keeping tallies, and miscellaneous writing, and including a main housing with a chamber formed therein for storage of writing materials, forms and the like, and with a hinged lid which supports a plate carrying a clipboard. The plate and clipboard are mounted on a swivel for rotation to any angle for convenience in writing, and there are front and rear holding brackets and straps secured to the main housing for hooking onto the wire frame of the underside of the front seat, and for anchored insertion into the space between the rear of the front seat, and the bottom of the upstanding back of the vehicle seat to hold the desk in place.

8 Claims, 3 Drawing Figures

AUTO DESK

This invention relates to improvements in portable desks which are especially adaptable for use in motor vehicles and the like.

An object of the invention is to provide a novel and improved auto desk device which is so constructed that it can be placed on a seat of an automobile, squad car or other vehicle, right next to the driver or other occupant for use as a desk.

Another object of the invention is to provide a novel and improved portable automobile desk which includes a main cabinet or body portion formed of strong sheet material, such as sheet steel, aluminum, or even plywood or composition board, and strong plastics which do not break up on impact, the cabinet walls enclosing a storage chamber which may be divided into compartments for papers, cards, forms and other materials, as well as pens, pencils, rubber stamps and the like.

A further object of the invention is to provide a novel and improved portable automobile desk which has a large-surfaced clipboard mounted on top, the clipboard furnishing a convenient smooth top surface for writing, and mounted for rotation to several positions, and which is slidable forward to give more arm room, and is also adjustable and comfortable for left handed writers.

Still another object of the invention is to provide a novel and improved automobile desk which is equipped with straps and buckles for holding it to the car seat, and a tubular steel bracket which keeps the desk from shifting on the seat.

Still a further object of the invention is to provide a novel and improved automobile and squad car desk which is simple in design, relatively inexpensive to manufacture, and which can be made up either by hand by sheet metal workers, or by mass production.

The above and other objects and advantages of the invention will become apparent from the following description of a preferred embodiment thereof, as illustrated in the accompanying drawings, forming a part hereof.

Figures 1, 2, 3:
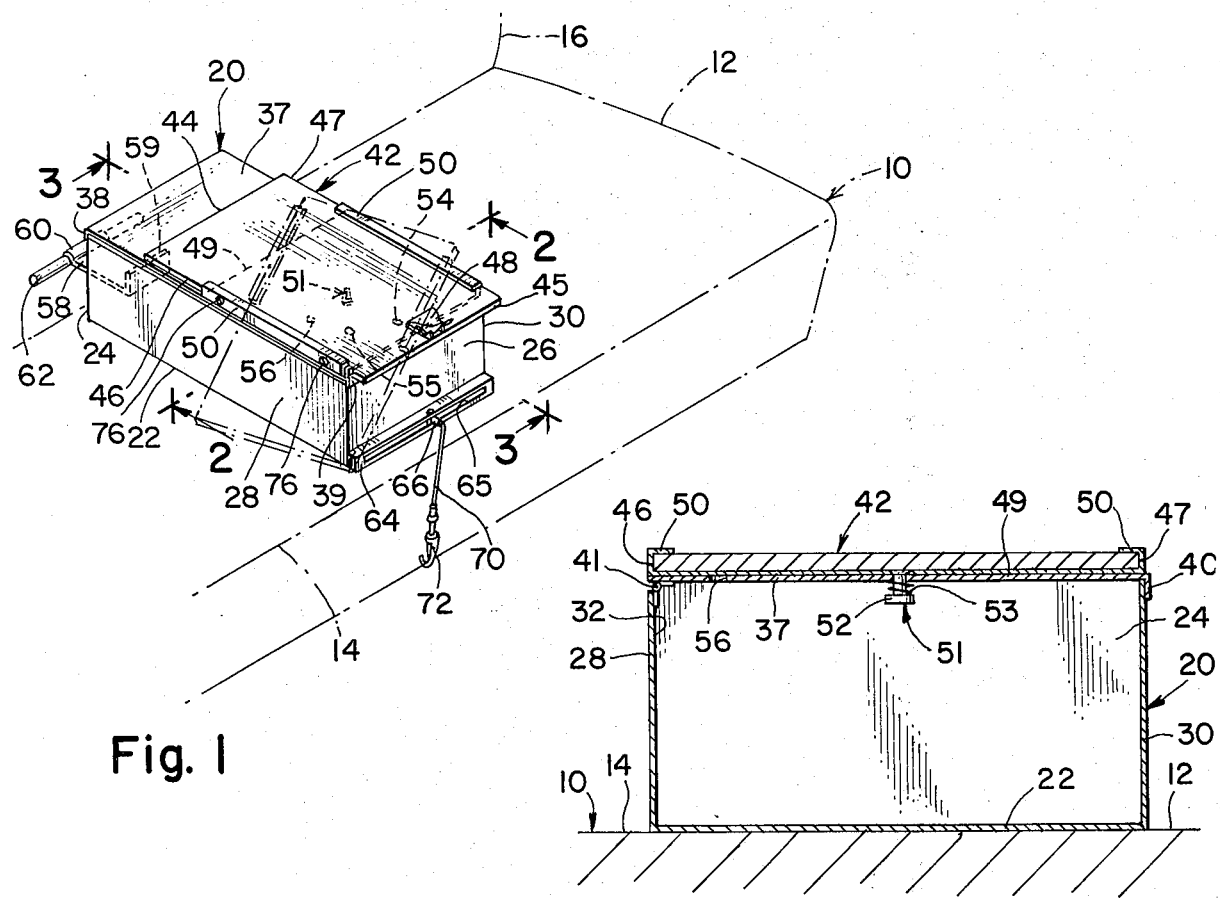
FIG. 1 is a perspective view of a seat of a motor vehicle, with the portable auto desk device secured in position thereon ready for use.
FIG. 2 is a sectional elevational view taken substantially on Plane 2—2 of FIG. 1, through the auto desk, and partly through the seat.
FIG. 3 is a sectional elevational view taken substantially on Plane 3—3 of FIG. 1, through the auto desk, and partly through the seat and seat back of the car.

In connection with the use of motor vehicles, it is frequently necessary for the driver or other occupant of the car to make notes, make reports, sketches and the like, and as is well known, the ordinary car has no facilities for aiding in this. In fact, there is nothing at all, except possibly the glove compartment, and this furnishes practically no room for papers, forms, writing materials, or even a smooth large writing surface on which to write.

The present invention seeks to provide a portable desk device, which can be placed in a motor vehicle, such as on the side or center portion of the front seat, and which has compartments for stationery, forms, writing instruments, paper clips, and also has a relatively large desk top portion somewhat like a clipboard, which is rotatable and provides a good rest surface for writing.

In order to understand clearly the nature of the invention, and the best means for carrying it out, reference may be had to the drawings, in which like numerals denote similar parts throughout the several views.

As shown, there is a motor vehicle, such as a private passenger car, a police squad car, or other automobile, with the seat 10, usually the front seat, in which the driver sits at the left side 12 of the seat, facing the steering wheel and another person, a companion or fellow officer may be seated on the right side 14 of the seat. The car has the usual back portion 16 of the front seat, both being usually upholstered with springs and padding stuffing.

In connection with the work of police officers using patrol and squad cars, it has been said that on the many television shows depicting the activities of such officers, it is rare to see them in the act of making up written reports, and yet as any officer well knows, this is an important and time consuming detail of their work, and which cannot be delayed until they get back to the station house.

It has been held that the best evidence rule applies, and that a written report made at the time of the incident and without delay, is even better evidence than a later remembrance by the witness of what he believes occurred, especially when he may have been involved in several criminal incidents or accident occurrences in the course of a day, so that he may tend to become confused in trying to remember accurately what actually happened, what and who were involved, and what they said at the actual time of the incident. Further, if the officer is unfortunately wounded or killed after writing down what happened, then there is a good opportunity to track down the persons involved, from his written report made at the scene or shortly thereafter.

As shown, the portable auto desk 20 has a bottom floor wall 22, formed of rugged sheet material, such as steel, aluminum, high impact plastic sheeting, or even plywood or composition board. It includes front and rear end walls 24 and 26, integral with the floor wall 22, and left and right side walls 28 and 30, all secured to the edges of the floor wall 22, or upformed therefrom or welded thereto. This defines the main cabinet chamber 32 for the reception and storage of stationery, forms and other materials needed. The main cabinet chamber may be partitioned off into compartments, such as a front compartment 34, by partition walls 36.

A cover member or lid 37 covers the main cabinet chamber 32 and has depending end flanges 38 and 39, and a side flange 40, the cover member being hinged to one side wall of the chamber by a piano type hinge 41, so that on lifting the cover, the entire inside of the main chamber is exposed to view for reaching in to take out stationery or notebooks, or writing materials, and for refilling when needed. A clipboard 42 is rectangular in shape, with end edges 44 and 45 and side edges 46 and 47, and may be made of suitable sheet material, such as plywood, pressed composition wood, or light weight metal, such as sheet steel, anodized aluminum or the like. The clipboard may have marginal rims or channels secured along its edges, and a spring biased clip or clamp 48 is secured at one edge 45 of the clipboard, for use in holding a pad of paper, a form, or other material so it does not fall or blow away.

A support plate 49 is placed under the clipboard, and has edge channels 50 bent up out of the plate 49, to hold the clipboard, and at the same time permitting it to be slid out as desired, for the convenience of the person writing on it. A swivel pin or bolt 51 has its bevel head countersunk into a conical hole in the plate 49, and has a knurled nut or wingnut 52 for tightening it in place with the aid of the spring 53 over its shank.

It is thus seen that the clipboard may be either left in its normal position as seen in FIGS. 1 and 2, being held in this position by a small front lock pin 54 extending through a hole in the cover lid 37, or may be swung through 45° to engage the lock pin 54 with another angle hole 55, or through 90° to engage the pin 54 with another angle hole 56. The spring 53 yields to allow the clipboard to be raised to swing to any of these positions, and move locking holes may be made for other angular positions of the clipboard.

To secure the desk to the seat of the car, a rear bracket 58 has a flange 59 riveted to the cabinet wall 24, as seen in FIG. 3, and has its left end 60 rounded and riveted or pinned to the cylindrical anchor rod 62, so that the bracket is inserted between the rear of the seat, and the lower edge of the seat back 16, which yield and hold it securely in position until removed. At the same time, for securing the desk to the front of the seat, a channel member 64 is secured to the lower edge of the cabinet wall 26, and has an elongated slot 65 formed therein to receive and retain the enlarged head of the bolt 66, there being a strap 70 secured at one end to the retaining bolt 66, and at the other end to a halter snap hook 72, which is snapped over one of the lateral seat wires 73 of the underside of the seat. A slip buckle 74 or the like is interposed between the two portions of the strap 70, for adjustment of length and tightness of the desk to the seat.

Small tension screws 76 may be threaded through holes in the channels 50 to hold the clipboard securely against sliding. It is thus seen that this auto desk fills a real need for persons who have to make reports, including salesmen, officers, road traffic supervisors, taxi drivers and others, and may be made in several sizes. It is so mounted that its clipboard rotates to three or more positions, and slides forward to give more arm room, and is also comfortable to left handed writers. It may be made in different colors, and coated with enamel baked on in a wrinkle finish to avoid smudges and finger prints from showing.

Although the invention has been described in specific terms, it is understood that various changes may be made in size, shape, materials and arrangement without departing from the spirit and scope of the invention as claimed.

Having herein described the invention, what is claimed as new is:

1. A desk device for use in vehicles, which comprises:
   a. a main housing having a chamber formed therein;
   b. a cover lid hingably mounted onto said main housing;
   c. a support plate having channel edges mounted on said cover lid;
   d. a clipboard slidably engaged in said channel edges of said support plate allowing said clipboard to be affixed in any desired longitudinal position on said support plate;
   e. a pivot swivel carried by said support plate and extending through an opening in said cover lid for angular rotation of said support plate and said clipboard therewith, about said pivot swivel for rotation of said clipboard from any position to any other desired position;
   f. angle locking pins carried by said support plate for extending through any one of a plurality of locating holes formed through said cover lid, for releasably retaining said clipboard and said support plate in any desired angular rotated position; and
   g. means for securing said desk device to a vehicle seat portion.

2. A device according to claim 1, wherein said clipboard includes a clip clamp secured to one end marginal edge of said clipboard, said clipboard adapted to receive paper, pads, and the like within said clamp.

3. A device according to claim 1, wherein each said edge channel further includes at least one tension screw threaded through said channel edge for bearing against said clipboard for retaining said clipboard in any desired longitudinal position.

4. A device according to claim 1, wherein said means for securing further comprises:
   a. a bracket mounted on said housing, said bracket adapted to be extensible into an inter space between a lower portion of said vehicle seat portion and an under surface of an upstanding back of said vehicle seat portion; and
   b. an anchor carried by said bracket for releasably retaining said bracket in operative position with said housing in contact with said upstanding back of said vehicle seat portion.

5. A device according to claim 1, wherein said means for securing further comprises:
   a. a strap adapted to be received at one end thereof on a lateral spring on the underside of said vehicle seat; and
   b. a slotted channel mounted on said housing, said slotted channel means adapted to receive another end of said strap.

6. A device according to claim 5, wherein said strap further includes a slip buckle.

7. A device according to claim 1, wherein said housing includes a floor wall and end and side walls secured to said floor wall for defining said chamber.

8. A device according to claim 1, wherein at least one partition wall divides said chamber into at least two compartments.

* * * * *